(12) United States Patent
De La Guardia Gonzalez et al.

(10) Patent No.: US 11,004,332 B2
(45) Date of Patent: May 11, 2021

(54) COOPERATIVE MAPPING FOR AUTONOMOUS VEHICLES, ROBOTS OR MULTI-AGENT SYSTEMS

(71) Applicant: Intel Corporation, Santa Clara, CA (US)

(72) Inventors: Rafael De La Guardia Gonzalez, Guadalajara (MX); Rodrigo Aldana Lopez, Zapopan (MX); Leobardo Campos Macias, Guadalajara (MX); David Gomez Gutierrez, Tlaquepaque (MX); Anthony Kyung Guzman Leguel, Guadalajara (MX); Jose Ignacio Parra Vilchis, Guadalajara (MX)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/722,941

(22) Filed: Dec. 20, 2019

(65) Prior Publication Data
US 2020/0135014 A1   Apr. 30, 2020

(51) Int. Cl.
*G08G 1/01* (2006.01)
*G08G 1/16* (2006.01)
*G05D 1/00* (2006.01)
*G01C 21/32* (2006.01)

(52) U.S. Cl.
CPC ........... *G08G 1/0112* (2013.01); *G01C 21/32* (2013.01); *G05D 1/0088* (2013.01); *G08G 1/0145* (2013.01); *G08G 1/161* (2013.01); *G05D 2201/0213* (2013.01)

(58) Field of Classification Search
None
See application file for complete search history.

(56) References Cited

U.S. PATENT DOCUMENTS

2019/0139403 A1*  5/2019  Alam ............... H04W 4/40

OTHER PUBLICATIONS

Yuan T, Nuss DS, Krehl G, Maile M, Gern A. Fundamental properties of dynamic occupancy grid systems for vehicle environment perception. In2015 IEEE 6th International Workshop on Computational Advances in Multi-Sensor Adaptive Processing (CAMSAP) Dec. 13, 2015 (pp. 153-156). IEEE.
Thrun S, Burgard W, Fox D. A real-time algorithm for mobile robot mapping with applications to multi-robot and 3D mapping. InICRA Apr. 24, 2000 (vol. 1, pp. 321-328).

(Continued)

*Primary Examiner* — Thomas S McCormack
(74) *Attorney, Agent, or Firm* — Schiff Hardin LLP

(57) ABSTRACT

Techniques are disclosed to facilitate cooperative mapping for safe and efficient trajectory planning and collision avoidance by allowing nearby agents to share contextual information. The described techniques also function to extend the mapping range of a single agent by leveraging observations made by multiple agents. Furthermore, the techniques as described herein function to reduce uncertainty in trajectory planning by allowing agents to "see" behind occlusions, thus taking advantage of observations made by neighboring agents from different points of view. An efficient hardware implementation of the system is also presented that leverages the methodologies as discussed herein.

19 Claims, 10 Drawing Sheets

(56) References Cited

OTHER PUBLICATIONS

Kohlbrecher S, Meyer J, Graber T, Petersen K, Klingauf U, von Stryk O. Hector open source modules for autonomous mapping and navigation with rescue robots. InRobot Soccer World Cup Jun. 24, 2013 (pp. 624-631). Springer, Berlin, Heidelberg.

Luis Contreras, Olivier Kermorgant, Philippe Martinet. Efcient Decentralized Collaborative Mapping for Outdoor Environments. International Conference on Robotic Computing, Jan. 2018, Laguna Hills, United States. <hal-01689868>.

Van Opdenbosch D, Steinbach E. Collaborative Visual SLAM Using Compressed Feature Exchange. IEEE Robotics and Automation Letters. Oct. 31, 2018;4(1):57-64.

Andersson LA, Nygards J. C-SAM: Multi-robot SLAM using square root information smoothing. In2008 IEEE International Conference on Robotics and Automation May 19, 2008 (pp. 2798-2805). IEEE.

Montijano E, Cristofalo E, Zhou D, Schwager M, Saguees C. Vision-based distributed formation control without an external positioning system. IEEE Transactions on Robotics. Mar. 10, 2016;32(2):339-51.

* cited by examiner

COOPERATIVE MAPPING FOR AUTONOMOUS VEHICLES, ROBOTS OR MULTI-AGENT SYSTEMS

TECHNICAL FIELD

Aspects described herein generally relate to mapping systems for autonomous systems and, more particularly, to techniques implementing cooperative map updating among autonomous agents.

BACKGROUND

Maps are essential tools that enable the deployment of so-called "agents," which are mobile computing systems associated with self-driving/driverless cars or robots in public spaces. The more complete a map is, the more information is available for each agent to plan a safe and efficient trajectory from its current position to its desired goal. Most environments of interest, however, are not static but change over time due to factors such as the activity and/or movement of people and objects within the environment. Therefore, maps used for navigation by such agents need to be updated continuously based on information collected online by the agents using sensors, which are typically carried onboard or embedded in the infrastructure and communicated to the agents. Current techniques to update these maps generally require excessive processing and/or memory storage, and thus have been inadequate.

BRIEF DESCRIPTION OF THE DRAWINGS/FIGURES

The accompanying drawings, which are incorporated herein and form a part of the specification, illustrate the aspects of the present disclosure and, together with the description, and further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

Figure 1:
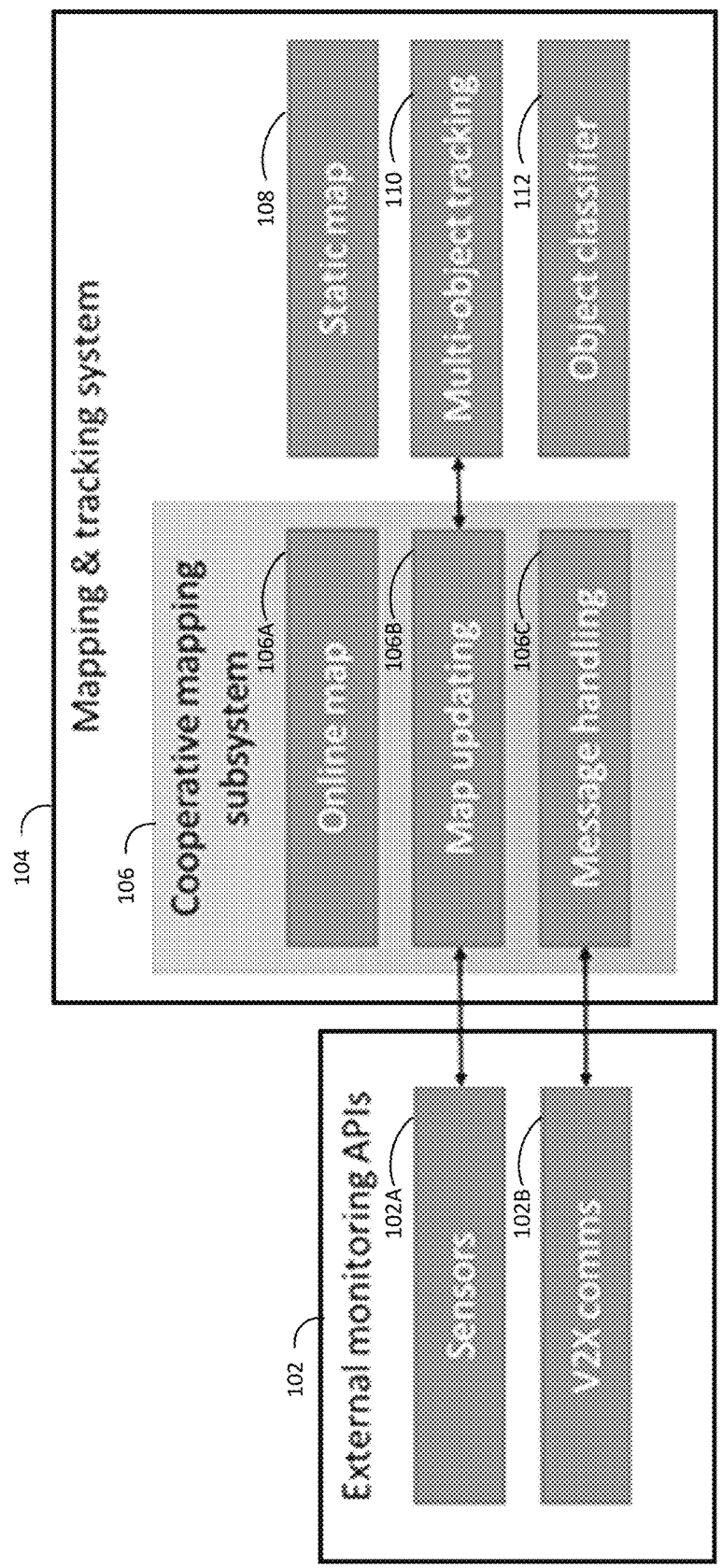
FIG. 1 illustrates a block diagram of exemplary components constituting a mapping and tracking system, in accordance with an aspect of the disclosure.

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Again, current techniques to address map updating in an environment used by autonomous agents has drawbacks including large memory usage and the use of excessive processing power. Current map updating solutions are also inefficient and may not provide each agent with an accurate map of the environment. For instance, most of the current solutions for mapping dynamic environments, such as Dynamic Occupancy Grid, do not use cooperation among the agents but instead rely on self-mapping that is carried out by each agent, taking into account only its own sensor information. Moreover, agents that only rely on their own sensors to maintain their own maps up-to-date often rely on structured environments, are prone to occlusions, and may react late to changes in the environment.

Cooperative mapping solutions known as cooperative simultaneous localization and mapping (CSLAM) has been proposed. However, such solutions are normally used only for static mapping applications. And, as noted above, techniques directed to relative localization between agents by communicating observed features are computationally expensive and only account for the presence of other cooperating agents. Furthermore, cooperative map solutions and representations do not take into account dynamic objects in the environment, and the generated trajectories using these maps may be over-constrained. Also, most techniques focus on map merging rather than maintaining a common map up to date, which requires communication of redundant data for registration of 3D point clouds.

Methods designed to exploit collaborative mapping also require a central server to constantly check for new key frames that are shared by agents for correspondences in any of the maps. Previous methods for relative localization also assume common features obtained from the same type of sensors are shared between agents. Thus, efficient map representations with respect to the task of cooperative map maintenance has not been addressed using conventional techniques.

Therefore, to address these issues, the aspects described herein are directed to techniques for cooperatively updating maps for a group of agents so that the maps accurately reflect the current environment as it affects the operation of the agents in the environment. The aspects described in the present disclosure also help to increase the mapping range of each agent in the presence of dynamic obstacles and occlusions. To do so, the aspects described herein leverage the use of local maps for many types of agents such as autonomous cars, for instance, which use dynamic occupancy grids (DOGs) for the purpose of tracking moving objects. The aspects described herein thus supplement such tools by marking the location of significant obstructions that require attention by the navigation systems of vehicles while improving the confidence and the range for detecting obstructions by means of leveraging the sensors from other agents. Data from the proposed system can be used for initializing and terminating tracks, as well as for updating the state of the DOG based on information obtained from neighboring agents. For example, the aspects described herein may provide the location of stopped vehicles or other hazards that would otherwise require additional cycles to identify.

In particular, the aspects as described herein pertain to robotic vehicles and other mobile computing systems referred to herein generally as "agents," which coexist with one another and move within part of a shared environment. This shared environment may include different types of spaces depending upon the particular application, such as a road network, air space, an indoor industrial facility, etc. A methodology and algorithm is presented to cooperatively map the location of certain objects of interest by a group of agents. The map thus created contains all the important information needed by an agent to plan safe trajectories inside a region of interest shared with other agents.

Specifically, the created map contains all the static objects delimiting the navigable space of an agent that may affect planning decisions made by any of the participating agents. Moreover, the created map may contain information about certain types of dynamic objects located inside the region of interest but outside the navigable space. For example, in the case of road vehicles, such dynamic objects may be pedestrians on the sidewalks. Optionally, the created map may also include information about the dynamic objects inside the navigable space. Thus, all the objects mapped by the overall system of agents may come either from observations made by a particular agent (e.g. an "ego vehicle") using onboard sensors, or by other agents using their own sensors.

Still further, the aspects as described herein enable agents within a certain distance from each other to communicate and, in particular, to exchange information about updates each agent has made to their respective maps. Optionally, a central server may collect and fuse updates from each of the agents, which may function to serve an "official" set of updates back to the agents. The overall objective is that agents inside an operating region maintain a consistent map that each agent may use to plan trajectories and to navigate safely and efficiently inside the shared region. To achieve this objective, the aspects as described herein provide a methodology to mark areas of the map that have changed and to efficiently construct messages to communicate such changes to other neighboring agents.

The aspects as described herein thus enable cooperative mapping to facilitate safe and efficient trajectory planning and collision avoidance by allowing nearby agents to share contextual information, and also extends the mapping range of a single agent by leveraging observations made by multiple agents. Furthermore, the aspects as described herein function to reduce uncertainty in trajectory planning by allowing agents to "see" behind occlusions, thus taking advantage of observations made by neighboring agents from different points of view. And because agents share the same map representation with one another, the choice of sensors may be heterogeneous between agents, as only map changes need to be communicated, which requires a lower bandwidth compared to conventional systems. An efficient hardware implementation of the system is also presented that leverages the methodologies as discussed herein.

FIG. 1 illustrates a block diagram of exemplary components constituting a mapping and tracking system, in accordance with an aspect of the disclosure. The system 100 as shown in FIG. 1 may be integrated as part of or otherwise be accessed and/or implemented by a suitable type of agent to enable full or partial autonomous control of the agent. For example, an agent using the system 100 may be a forklift, a vehicle, a motorcycle, an electric bicycle, etc. The system 100 is shown by way of example and not limitation, and the aspects as described herein may implement a system that includes additional, less, or alternative components as those shown in FIG. 1.

The system 100 as shown in FIG. 1 may be generally divided into an external monitoring system 102 and a mapping and tracking system 104. The mapping and tracking system 104 may be implemented as any suitable combination of hardware and software to realize the functions of the various aspects as described herein. For example, and as further discussed below, portions of the mapping and tracking system 104 may be implemented as part of (or the entirety of) a system on a chip (SoC) or other suitable processing circuitry, including known architectures.

The external monitoring system 102 may include one or more interfaces, such as the sensor interface 102A and the communication interface 102B, which each may function in accordance with any suitable type and number of sensor and communication interfaces, respectively. The external monitoring system 102 may thus include any suitable number and type of appropriate interfaces to provide sensor data to the mapping and tracking system 104 and/or to facilitate communications between the mapping and tracking system 104 and the external environment in which the system 100 operates. The number and type of components implemented as part of the external monitoring system 102 may thus be dependent upon the application and/or the particular type of agent in which the system 100 is used.

For example, if the system 100 is installed as part of an autonomous vehicle, then the communication interface 102B may operate to enable communications in accordance with a suitable communication protocol such as the vehicle-to-everything (V2X) communication protocol, for example, as shown in FIG. 1. Again, additional, less, or alternative communication interfaces may also be used in accordance with various aspects. Moreover, the sensor interface 102A may be configured to provide relevant sensor data to the mapping and tracking system 104, which may include data received via radar components or other suitable sensors configured to provide information about objects detected in the external environment regarding their size, location, speed, range, trajectory, etc. For example, the mapping and tracking system 104 may interface with the external monitoring system 102 to utilize a dynamic occupancy grid or similar tools used for tracking moving objects. As shown in FIG. 1, regardless of the number and type of sensor and communication interfaces that are implemented, aspects include using any suitable type of software components (e.g., application programming interfaces, or APIs) to facilitate the translation, interpretation, interface, and/or storage of data received from the external monitoring system 102 and transmitted to the mapping and tracking system 104, and vice-versa.

The static map 108, the multi-object tracking module 110, and the object classifier module 112 may be implemented using any suitable techniques, and may be present as part of a known or otherwise existing agent architecture. For instance, the static map 108 may be a preloaded static map that is stored in a suitable memory. The multi-object tracking module 110 may facilitate any type of multi-object tracking system suitable for autonomous applications. For example, the multi-object tracking module 110 may implement a two-step procedure that includes detecting potential objects-of-interest using an object detection algorithm, and then linking these potential objects across different frames to form so-called tracklets. An example of an existing object detection and tracking system, which may be implemented in the system 100 via the multi-object tracking module 110, includes the use of speeded-up robust feature (SURF) computer vision algorithms. In other words, the multiple-object tracking module 110 may function to detect multiple objects in the current static map environment. The object classifier module 112 may use data obtained via the multiple-object tracking module 110 as part of any suitable classifier-based system to facilitate the identification of these detected objects based on, for example, a correlation of extracted and classified features based upon each object's size, shape, trajectory, path, etc.

The mapping and tracking system 104 may also include a cooperative mapping subsystem (CMS) 106 that includes an online map 106A, a map updating module 106B, and a message handling module 106C. The cooperative mapping subsystem 106 is the focus of the aspects of the present disclosure as further discussed herein, and may work in conjunction with the external monitoring system 102 as discussed above as well as other components of the system 100, such as the static map 108, the multi-object tracking module 110, and the object classifier module 112.

Thus, aspects include the CMS 106 being configured may include as any suitable number and type of computer processors, controllers, hardware components, software components, memory, or any combination thereof. For instance, the CMS 106 may be implemented as one or more portions of a SoC, as mentioned above and discussed further herein with respect to FIGS. 5A-5B. Additionally or alternatively, the CMS 106 may include one or more computer-readable media such as volatile or non-volatile memory, for instance (e.g., non-transitory computer-readable media) configured to store executable instructions and/or code that, when executed by the CMS 106 (e.g., processors associated with the CMS 106 and/or other components of the system 100, the SoC 520, etc.) result in the realization of the various aspects as described herein. As an illustrative example, the CMS 106 may store and/or access one or more non-transitory computer readable media to carry out the various steps as shown and described herein with reference to the method 300 of FIG. 3 and/or any other aspects as described herein.

In an aspect, the CMS 106 is configured to maintain an online map based on prior information obtained via the preloaded static map 108 as well as from information received via the external monitoring system 102. The information received via the external monitoring system 102 may include, as noted above, new and recent information obtained from onboard sensors and/or from communication with other agents, such as information contained in messages transmitted by other agents and received by the agent, as further discussed herein. Via the use of the external monitoring system 102, the CMS 106 and, more particularly, the map updating module 106B, may also exchange information with a Dynamic Occupancy Grid or similar tools used for tracking moving objects to update the current map, as further discussed below.

In an aspect, the online map 106A may be represented as a hierarchical data structure such as an octree, for instance, having L levels and axes-aligned bounding boxes, as further discussed below. The online map 106A may be implemented as data stored in any suitable memory and in any suitable configuration. For instance, the online map 106A may be stored using a hardware implementation of a data structure such as contextual memory, as further discussed below with reference to FIG. 5B, which may facilitate the management and realization of cooperative map updates. However, for ease of explanation, the software components of the online map 106A is first described.

In an aspect, world points are inserted into the online map 106A at a selected hierarchy level 1 (which again may include a total of L levels) using a key or spatial code computed in accordance with Equation 1 as follows:

$$\text{Key}(p, l) = \text{Cat}\left(\text{Floor}\left(\frac{p}{2^L - l_r}\right), l\right) \quad \text{Eqn. 1}$$

With reference to Equation 1 above, p is a vector (e.g., p={x, y, z}) in 3D space and r is a scalar map property equal to half the length dimension of the smallest voxel stored in the online map 106A. The mathematical Floor(•) function may thus be applied element-wise to each element of p, and the function Cat(•) flattens and concatenates the elements of its argument to output a one-dimensional list. To retrieve the map content at a query location p, the above formula represented in Equation 1 may be used to generate different keys from the root level (i.e. l=0) up to the total number of levels L (i.e. l=L) until the key is found. Thus, in an aspect, the value corresponding to a key is typically a data structure containing the occupancy state of the voxel, e.g., a floating point number between 0 and 1 indicating the occupancy probability, and may optionally also include other contextual or semantic information associated with that particular location.

In an aspect, the occupancy probability may be defined in terms of how many times a voxel has been observed by an agent as either occupied or free at a particular moment. The occupancy probability may be expressed by leveraging the universal law of radioactive decay, and thus the probability of a voxel being occupied at time t is expressed in accordance with Equation 2 as follows:

$$p(t) = N_0 e^{-\lambda(t-t_0)} \quad \text{Eqn. 2:}$$

With reference to Equation 2 above, $N_0=p_o+\gamma(1+\text{sign}(s) \cdot p_o)$, with $p_o$ being the previous occupancy probability, $\gamma$ being a design variable that controls how fast the occupancy is saturated to 1, and s is the state of the voxel, where +1 represents a free voxel and −1 represents an occupied voxel. Moreover, $t_0$ represents the last time when the voxel was updated and λ is a decay factor that depends on the classes representing the agents or environment. For instance, a car or pedestrian has a larger λ value, since it may be moving. A tree or a wall, in contrast, has a lower λ as such objects are static in nature. An example of an online map represented by the online map 106A is further discussed below with respect to FIGS. 2A and 2B.

Figure 2A:
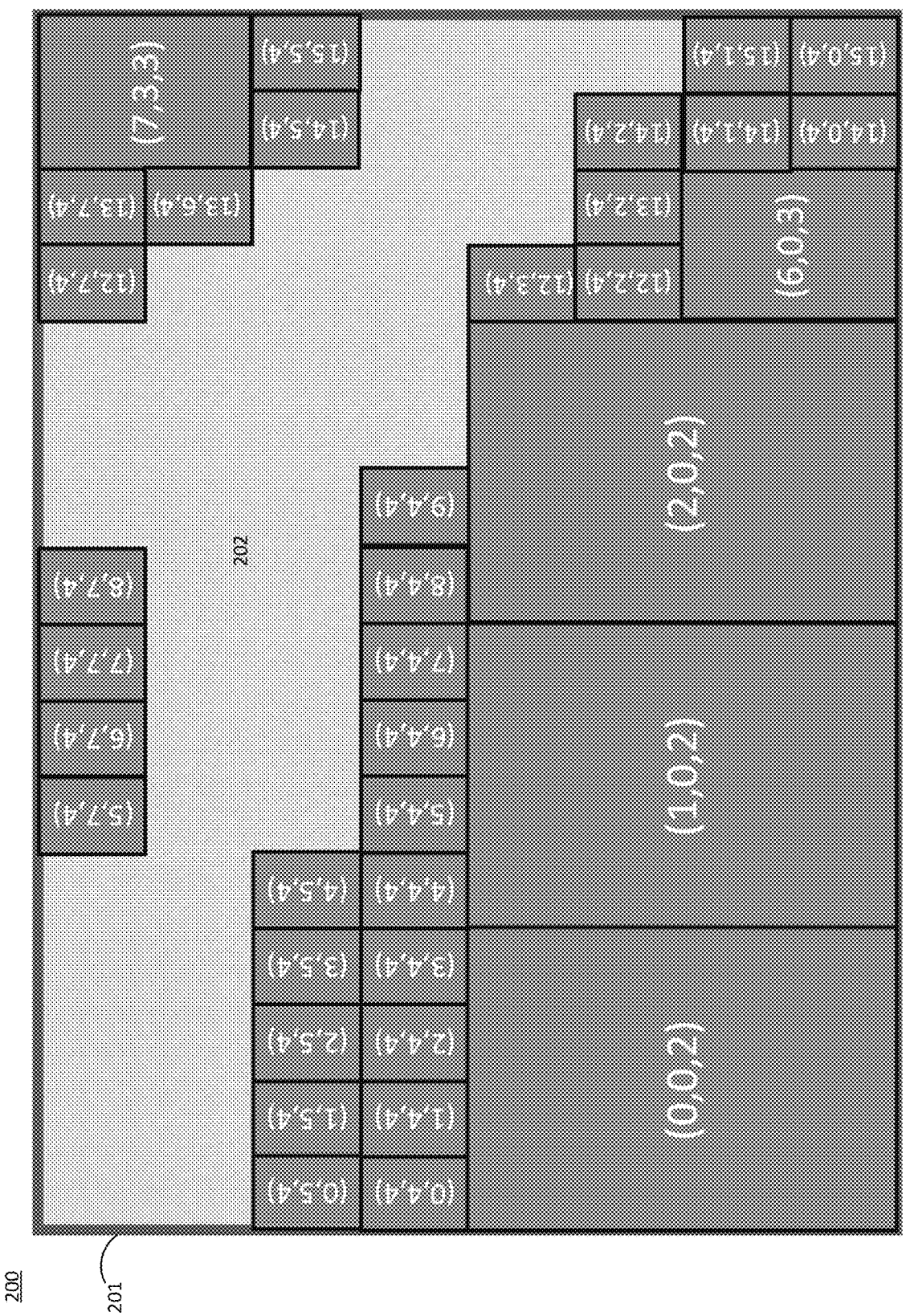
FIG. 2A illustrates an exemplary online map showing keys corresponding to occupied voxels, in accordance with an aspect of the disclosure.

FIG. 2A illustrates an exemplary online map showing keys corresponding to occupied voxels, in accordance with an aspect of the disclosure. The online map 200 shown in FIG. 2 is an example of an online map representing a 2D region. The online map 200 may represent a graphical example of an online map that is stored by the online map 106A, as shown in FIG. 1, for instance. The online map 200 shown in FIG. 2A is assumed to be anchored at a specific offset from the origin of a known global coordinate system. Therefore, to obtain the global coordinates of any point in the map, a translation and scaling is applied to the local coordinates, as further discussed below with respect to FIGS. 5B and 6. The offset and scaling factors used for this purpose may, in general, be different for each online map used by each respective agent participating in the coordinated mapping system as described herein. Therefore, aspects include these offset and scaling factors being communicated between agents when exchanging map messages, as further discussed below (e.g., via the external monitoring system 102).

In the example shown in FIG. 2A, the occupied voxels within the online map 200 are illustrated with accompanying coordinate values and are not otherwise labeled for purposes of clarity, whereas free space 202 is shown in the area between the occupied voxels and includes the remaining area. With respect to the occupied voxels in the online map 200, the numbers contained in the parentheses within each respective occupied voxel represent the map keys corresponding to that particular voxel. Specifically, the first two numbers within each occupied voxel represent x, y coordinates, and the last number within each occupied voxel represents the voxel level l, which may be considered as a representation of a "size" of the voxel. Thus, as an example, the key for the top voxel of the map 200 as shown in FIG. 2A may be represented as (0,0,0), which includes the entirety of the space indicated by the boundary 201 of FIG. 2A. It could be said that the level represents the "size" of the voxel, as each voxel is partitioned until the biggest level, and then the partitions of larger levels represent the same space albeit with smaller voxels. Continuing this example, a voxel (0,0,1) (not shown with a label) would represent a first half of the space indicated by the boundary 201. In other words, this voxel (0,0,1) would be the space containing the voxels (0,0,2) and (1,0,2) as shown in FIG. 2A, as well as voxels (0,1,2), (1,1,2), which are not shown with labels in FIG. 2A but would be represented by several smaller voxels (0, 4, 4)-(9,4,4), (0,5,4)-(4,5,4), and (5,7,4)-(8,7,4) each having a larger level as shown.

Figure 2B:
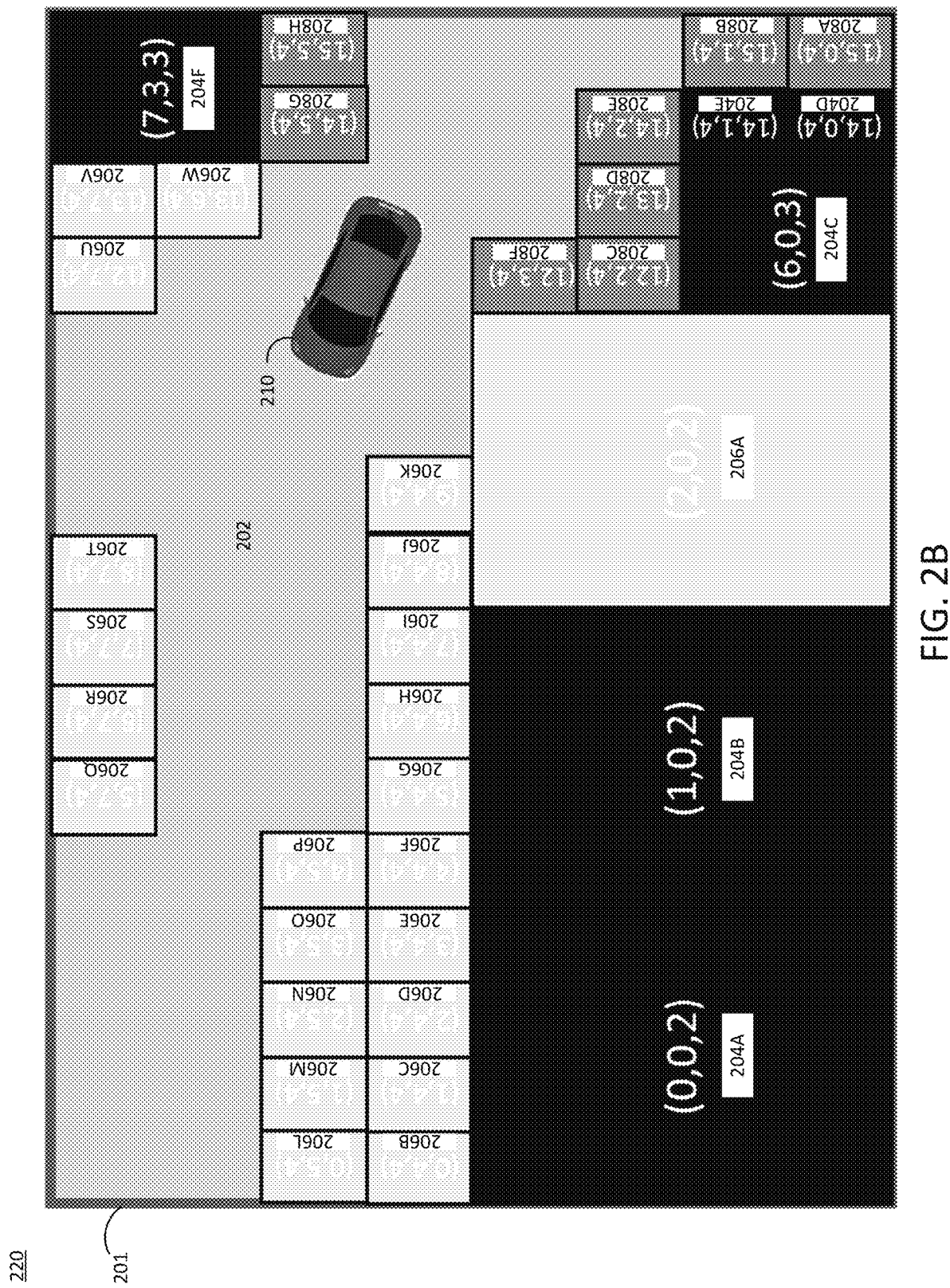
FIG. 2B illustrates the exemplary online map of FIG. 2A showing a representation of an ego vehicle, in accordance with an aspect of the disclosure.
Figure 2C:
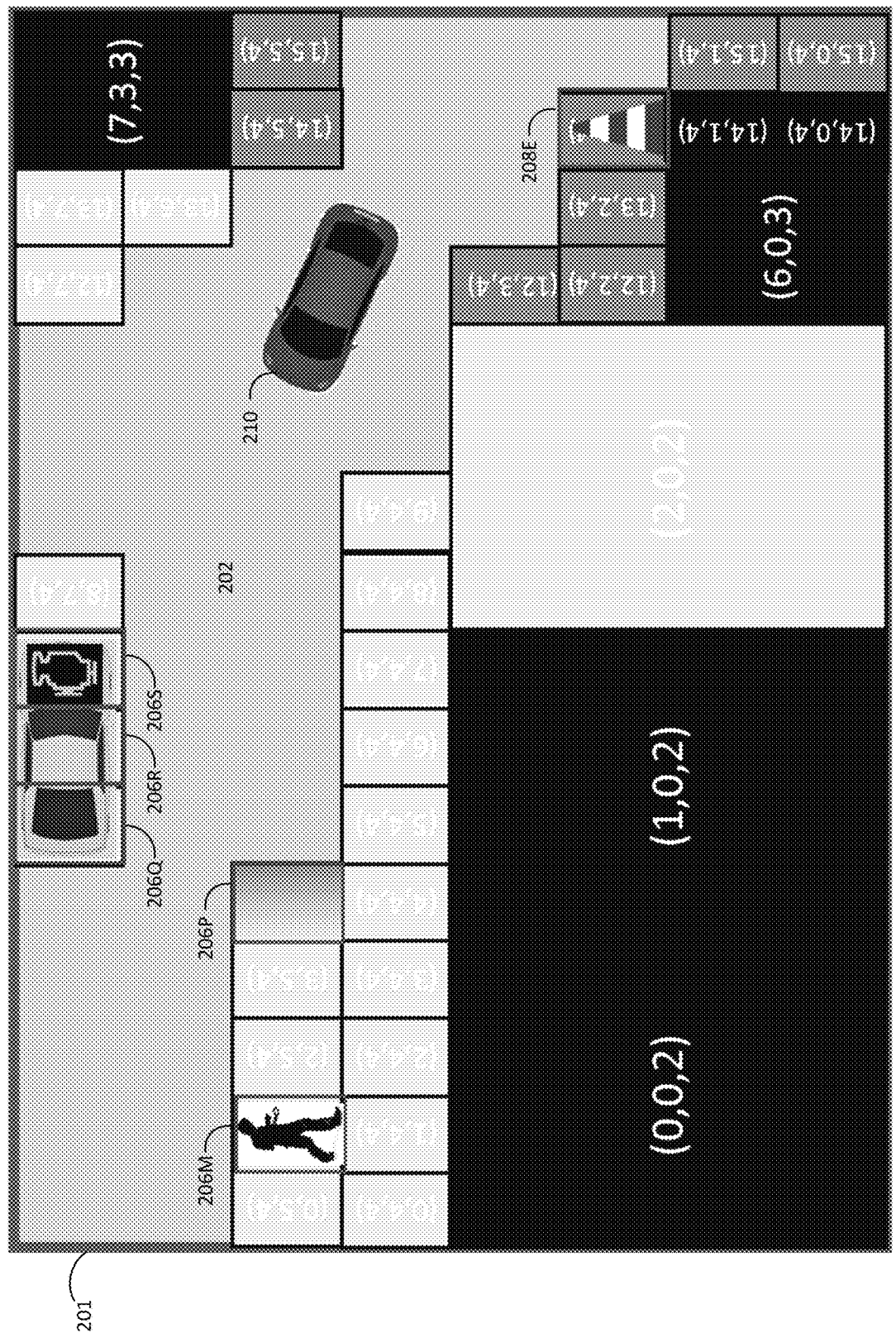
FIG. 2C illustrates an exemplary road scene highlighting updates to an online map to be communicated between agents, in accordance with an aspect of the disclosure.

The online map 200 shown in FIG. 2A may represent an online map that may be used by an agent to plan paths for navigation. In other words, the system 100 as shown in FIG. 1 may be implemented by an agent to plan paths for navigation using the online map 106A, an example of which is shown in FIGS. 2A-2C. For example, FIG. 2B illustrates the exemplary online map of FIG. 2A that includes an ego vehicle, in accordance with an aspect of the disclosure. As shown in FIG. 2B, the ego vehicle 210 may implement the system 100 as shown in FIG. 1 and use the online maps 200, 220 as shown in FIGS. 2A-2B, respectively, for navigation planning. However, as shown in FIG. 2B, some of the voxels included in the online map 220 may not be relevant or useful from the point of view of the ego vehicle 210 with respect to a planning application.

Therefore, aspects of the present disclosure include the classification of different voxels into different categories of interest based upon their location within the map 220. For instance, in the case in which the agent is an autonomous car, such as the ego vehicle 210 as shown in FIG. 2B, the CMS 106 (e.g. via the map updating module 106B) may define a region of interest (ROI) for the purposes of planning navigation that includes the voxels inside a road area, an example of which is shown as the region 202 in FIGS. 2A-2B. The voxels that are inside or otherwise coincide with the region 202 are not shown in FIGS. 2A-2B for purpose of brevity, but these may be considered as "ROI voxels." Furthermore, the online map 220 as shown in FIG. 2B also includes several voxels 204A-204F that are located far (i.e., non-adjacent) to the road area (i.e. the region 202 and the corresponding ROI voxels 206, 208), which thus may be referred to herein as "non-adjacent voxels."

The voxels that are adjacent to the region 202, however, may be classified as belonging to different voxel categories depending upon their relevance to the ego vehicle 210, with two categories being used in this example. For instance, with reference to the orientation of the ego vehicle 210 as shown in FIG. 2B, the voxels 206A-206V are located in front of the ego vehicle 210 or at the side of the ego vehicle 210, and thus may be considered as "adjacent relevant voxels." With respect to the road area represented by the region 202, the adjacent relevant voxels 206A-206V may include regions associated with, for example, bicycle lanes, sidewalks, etc.

Furthermore, based upon the orientation of the ego vehicle 210, it is assumed that voxels in the region behind the current location of the ego vehicle 210 are no longer of interest to it. Therefore, the voxels 208A-208H may be referred to herein as "adjacent irrelevant voxels" with respect to the ego vehicle 210. However, the voxels 208A-208H in this region may still be relevant to neighboring agents (e.g. other agents traveling in the same direction as the ego vehicle 210 but situated behind it). Therefore, as further discussed below, aspects include the CMS 106 (e.g. via the message handling module 106C) incorporating the location and/or other information (e.g., the type of objects located within the voxels) of such adjacent irrelevant voxels 208A-208H as part of messages transmitted by the ego vehicle 210 (e.g., via the external monitoring system 102 as shown in FIG. 1).

In accordance with the present aspects, a new type of object of interest (OOI) is used by the CMS 106 to achieve map updating coordination among several agents within the same operating environment, which is added to the map structure implemented by the online map 106A. The OOI may indicate, for example, either the absence or the presence of an obstacle of a certain type, which is specified by an integer class label C. In this way, all the voxels in the baseline map (e.g., the online map 220 as shown in FIG. 2B) may have an empty obstacle object such that changes from this baseline map can be quickly identified as a collection of voxels having respective non-empty obstacle objects.

The properties of the obstacle object may include, in addition to the integer class label C, the voxel key k as noted above and an optional list of attributes, a, depending on the particular object class. In an aspect, the basic classes include the occupied voxel (a={occupancy probability: p}), and the empty voxel corresponding to free space. To provide additional examples, other obstacle classes may be defined to represent geometric objects such as Spheres (a={radius:r}), Cylinders (a={radius:r, height:h}), Cuboids (a={length:l}), etc. To provide additional examples, the obstacle classes may additionally or alternatively represent different types of agents, such as Pedestrian, Car, Truck, Disc Robot, Drone, etc., as well as general (e.g. static) objects depending on the environment represented by the online map such as Tree, Traffic Sign, Wall, etc.

Therefore, the aspects described herein enable map updates to be communicated between agents via messages to one another, which may be performed in accordance with any suitable type of communication protocol. Again, the may updates may be implemented by leveraging information identified by the OOIs included in the transmitted messages, which may indicate changes to the previous map by indicating the occupancy probability associated with the voxels within the map as well as any accompanying attributes as noted above. Thus, having defined a method to identify additions (or deletions) to the online map detected by an agent, the aspects described herein are also directed to methodologies to cooperatively update the maps of a group of agents. As a result of this group updating, the agents may coexist and generate effective plans to move safely in a shared environment.

In general, the cooperation maps belonging to different agents will be different because of differences in their routes, interactions, the type of sensors available to each agent, etc., even assuming that each agent begins with the same static map as a baseline. Thus, the aspects described herein may not achieve each agent having an identical map, but rather that each agent may interact with each other and share a similar representation of a particular environment. This may include, for instance, any relevant information needed to adequately manage each interaction among agents. Methods to infer the relevance of obstacles in this manner are further described below with reference to FIG. 3.

Figure 3:
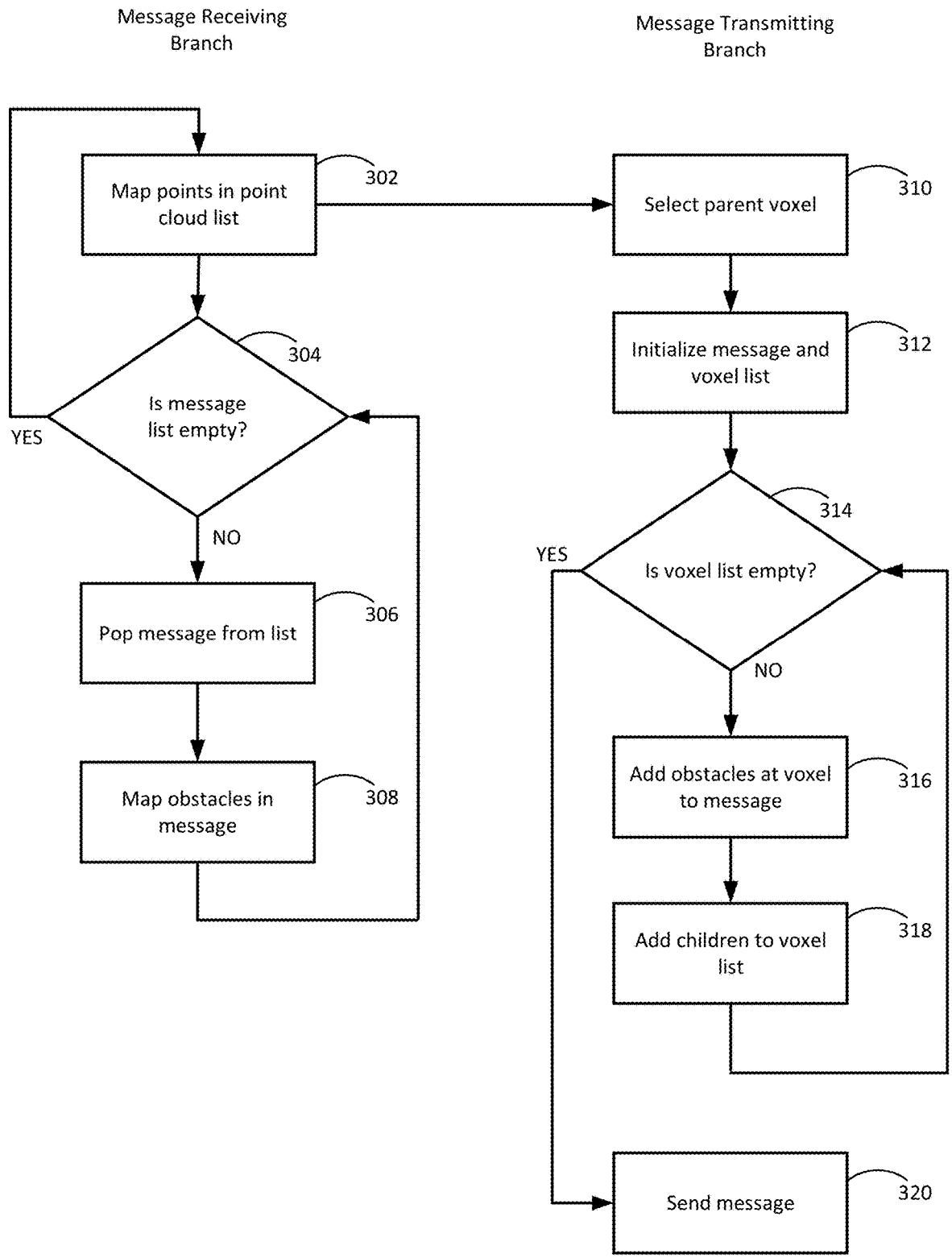
FIG. 3 illustrates a method flow associated with a map updating process, in accordance with an aspect of the disclosure.

FIG. 3 illustrates a method flow associated with a map updating process, in accordance with an aspect of the disclosure. In particular, the method 300 as shown in FIG. 3 indicates the various steps used by an agent to update that agent's "ego-map," as well as to communicate map updates to neighboring agents. Again, these steps may be performed by the various portions of the system 100 as shown in FIG. 1. For instance, the various steps associated with the method 300 may be executed by one or more portions of the CMS 106 and/or other components of the system 100. As another example, the various steps associated with the method 300 may be executed by one or more portions of the SoC 520 as shown and discussed further herein with respect to FIGS. 5A-5B, such as the HW contextual map subsystem 524 and/or the communications subsystem 526, the control logic subsystem 522, the NV memory subsystem 528, etc.

As shown in FIG. 3 and discussed in further detail below, the method 300 includes two different "branches." The first of these branches, referred to as the "message receiving branch," represents the steps associated with receiving messages from other agents and selectively updating the agent's map based upon these received messages. The second of these branches, referred to as the "message transmitting branch," represents the steps associated with preparing messages for transmission to other agent's with appropriate map updates. In an aspect, one or more steps associated with the message receiving branch and the message transmission branch may be executed in parallel (e.g., simultaneously or concurrently) with one another.

For example, the method 300 may begin by mapping (block 302) points in a local point cloud list using the agent's sensors (e.g. using sensor data received via the external monitoring system 102). Next, the method 300 may include preparing an update message for transmission while receiving any update messages that are transmitted from neighbor agents, a process that may continue in parallel with the other steps in the message receiving branch, as further discussed below. Continuing down the message receiving branch, the method 300 may include determining (block 304) whether the current message list is empty. If so, the agent may continue to map points in the point cloud list to maintain its local map up-to-date using sensor data (block 302). However, if update messages have been received from neighboring agents (i.e., the message list is not empty), aspects include popping (block 306) the next received message from the list, converting the data included in the message (e.g., data identified via the OOI and accompanying attributes) into the point cloud, and then mapping (block 308) any obstacles identified in the message list using the message information.

The method 300 may then repeat the process of popping (block 308) each message from the list and mapping (block 302) any obstacles as indicated in each message until the message list is empty (block 304, YES). At this time, the method 300 may include updating (block 302) the map points in the cloud list using the mapped obstacles that were identified from each of the received and popped messages. Again, and as further discussed herein and with respect to the illustrative example provided with respect to FIGS. 2C-2D, aspects include the messages including a subset of information that is less than the entirety of the online map data, such as only map updates, only map updates that are relevant to the agent receiving the messages, etc.

In various aspects, the received messages may be processed differently depending on the source and the criticality of each received message. For example, points extracted from messages from unknown agents may be assigned a high uncertainty or may be ignored entirely if they are deemed to have little impact on the current ego-agent's planned navigation.

Again, at the same time as the received messages are processed and the agent's local map is updated, an update message is prepared for sending to other agents, with the steps in the message construction and transmission process being represented as shown in FIG. 3 as the message transmission branch. This portion of the method 300 initiates the message construction by selecting (block 310) the "top" or "parent" voxel from the current map points in the cloud list (block 302). This is the voxel containing a region of any suitable shape. For example, the top or parent voxel may be a sphere centered at the agent's centroid with a radius selected in a range between the agent's nominal radius and the agent's communication range.

Next, the method construction process includes initializing (block 312) the voxel list with the children nodes of the parent voxel. For instance, a message may be initialized as shown in Equation 3 below as follows:

$$M = \text{Cat}(m, s=1, o_1 = (C, d, q, v)) \qquad \text{Eqn. 3}$$

With reference to Equation 3 above, m=Cat(p, l) are the map coordinates and octree level of the parent voxel, s is the number of objects in the message, C is the agent's class (e.g., car, drone, etc.), d is the offset of the agent's centroid from p, q is the agent's heading, and v is the agent's velocity. In accordance with the present aspect, transmission of the message is dependent upon whether the current voxel list is empty (block 314). Thus, the method 300 includes preparing and sending (block 320) a message for transmission when the voxel list is empty, and otherwise adding (block 316) any identified obstacles associated with the voxel along with children of the voxel to the voxel list (block 318).

This process may continue such that the top voxel is recursively popped from the voxel list and its obstacles are added to the message, including each popped voxel in the voxel list and any obstacles and children, until the voxel list is empty, at which point the message is transmitted (block 320). This process may be repeated each time the map is updated by the agent, i.e., the points are mapped within the cloud (block 302) by the agent. Thus, because this process is performed in parallel as new messages are received and/or the agent's map is updated, the messages transmitted by the agent to other agents may correspond to an accurate representation of mapped voxels and obstacles used by the agent.

Figure 2D:
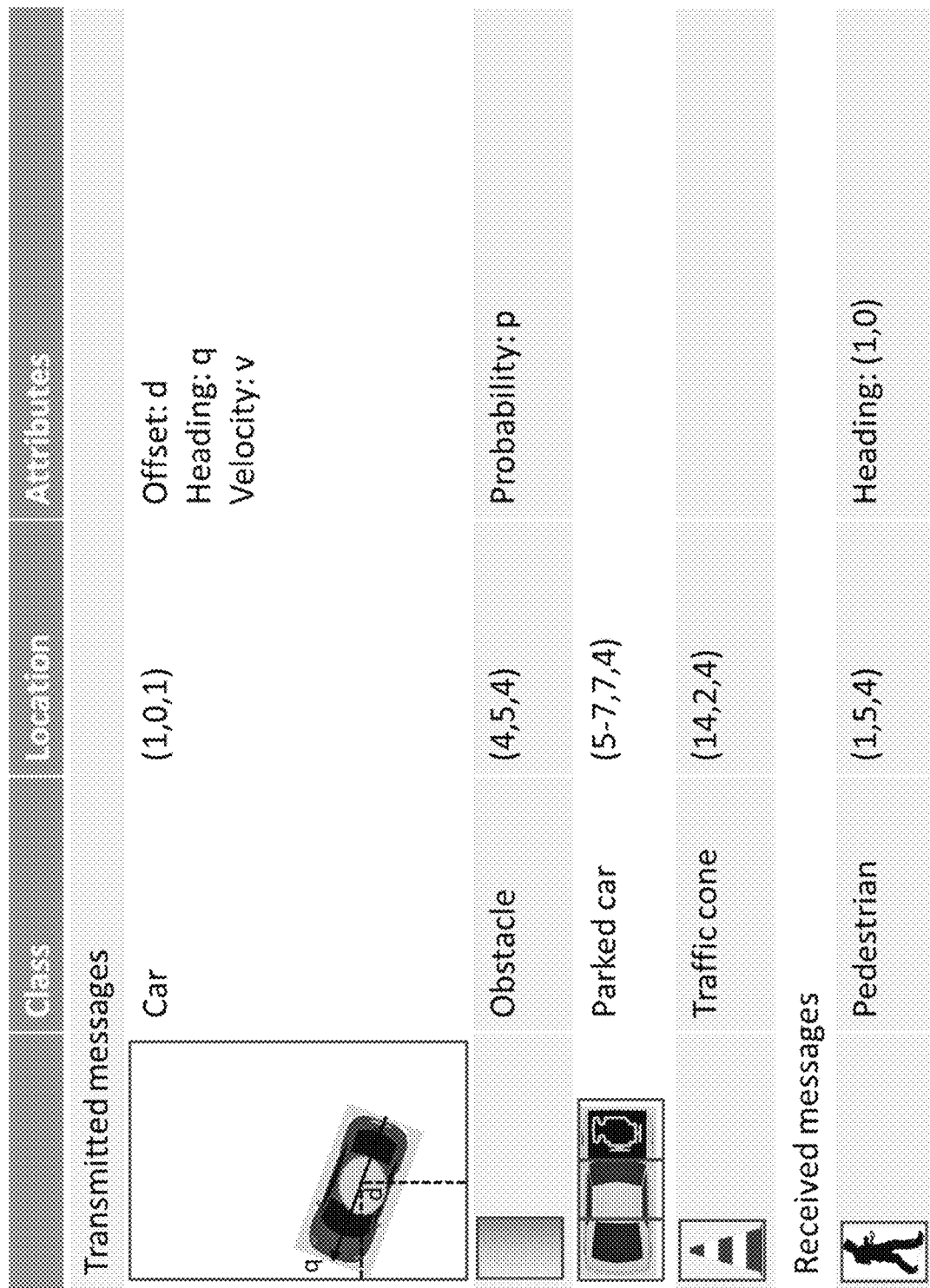
FIG. 2D illustrates an exemplary table summarizing the content of the messages that would be exchanged when providing updates to the online map as shown in FIG. 2C, in accordance with an aspect of the disclosure.

As an illustrative example, reference is now made to FIGS. 2C-2D. FIG. 2C illustrates an exemplary road scene highlighting updates to an online map to be communicated between agents, in accordance with an aspect of the disclosure. FIG. 2C represents the same baseline map 200, 220 as shown in FIGS. 2A-2B as an online map 240, although several of the voxel reference labels have been removed from the online map 240 as shown in FIG. 2C for clarity.

As shown in FIG. 2C, there are four other objects of interest in addition to the ego vehicle 210. For instance, another vehicle is parked at an unexpected location and is currently occupying voxels 206Q, 206R, and 206S, which may be caused by an engine malfunction, for instance. The ego vehicle 210 has also detected an object at location (4,5,4) occupying the voxel 206P, which is of an undetermined class and thus the voxel is represented as a blank, unfilled space. In accordance with the current aspects, the object at the voxel 206P is marked as an obstacle, and the containing voxel 206P is assigned an occupation probability p. Furthermore, as shown in FIG. 2C, there is also a pedestrian at location (1,5,4) occupying the voxel 206M, which is outside the field of view of the ego vehicle 210 because of an obstruction caused by the object occupying the voxel 206P at location (4,5,4). However, the pedestrian has been detected by a neighboring agent and its location has been communicated to other vehicles in the environment that are within range. In addition, the map 240 includes a traffic cone at location (14, 2, 4), which occupies the voxel 208E. The traffic cone was detected by the ego vehicle 210, but is currently behind it (i.e., in one of the adjacent irrelevant voxels as noted above). However, although the traffic cone at this location may not be relevant to the ego vehicle 210 based upon the location of the voxel 208E behind the ego vehicle 210, this object may nonetheless be of relevance to other agents in the area.

Therefore, reference is now made to the table as shown in FIG. 2D, which summarizes the content of the messages that would be exchanged between agents in this example. For instance, the transmitted message may be with respect to the ego vehicle 210, whereas the received messages may be transmitted from other agent's within range of the ego vehicle 210 and received by the ego vehicle 210. As shown and discussed above, the received message enables the ego vehicle 210 to identify the type of object (pedestrian) located at the voxel 206M, which would not otherwise be detected due to the obstruction of the object located at the voxel 206P.

In accordance with the current aspects, an agent may additionally select the voxels with a higher confidence of the state, that is, the voxels added to the message may be selected to be closer either to 0 or to 1, which represents the probability p that the voxel is either free or occupied, respectively. Optionally, if a trajectory of one or more of the surrounding agents also is available, the agent that constructs the message (e.g., the ego vehicle 210 in this current example shown in FIGS. 2C-2D) may calculate a portion of the map that the other agent must have sensed based upon an analysis of this trajectory, and therefore may not include this portion of the map as part of the transmitted message. In doing so, the aspects as described herein avoid sending updated information for voxels outside another agent's planned trajectory, reducing the message size.

Figure 4:
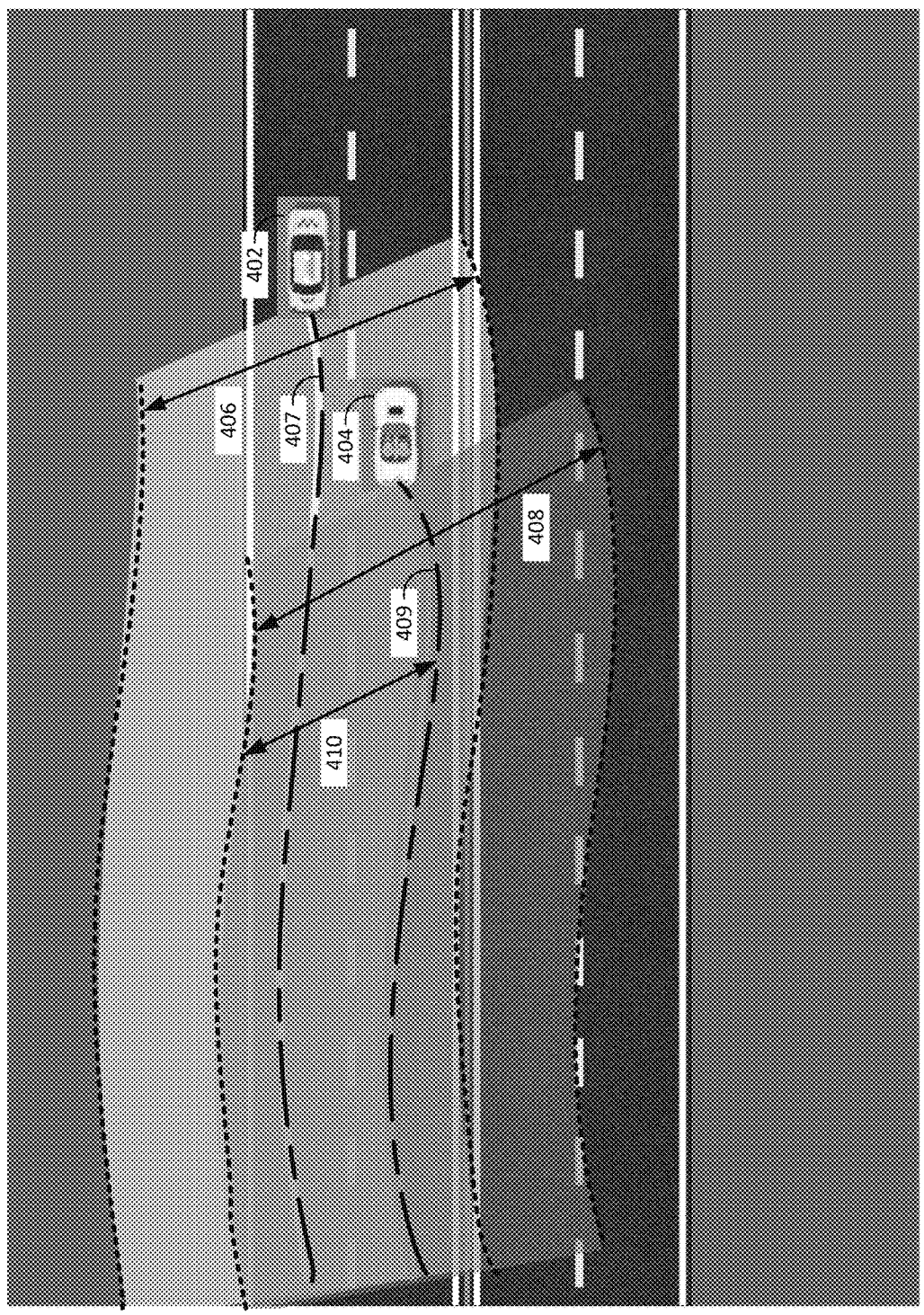
FIG. 4 illustrates an exemplary manner of using trajectory information to determine message content to be communicated between agents, in accordance with an aspect of the disclosure.

For example, FIG. 4 illustrates an exemplary manner of using trajectory information to determine message content to be communicated between agents, in accordance with an aspect of the disclosure. FIG. 4 shows an example of a sensed area 406 of one agent 402 and that agent's respective trajectory 407. FIG. 4 also shows another sensed area 408 associated with a second agent 404, along with the respective trajectory 409 for the agent 404. In this example, the agent 402 is assumed to be aware of the trajectory 409 of the agent 404 based upon communications between the agents 402, 404. Therefore, the region 410, which overlaps between the sensed areas 406, 408 may be calculated and discarded from the message package that is transmitted by the agent 402 to the agent 404. In particular, the agent 402 may transmit a message including map voxel updates associated only with regions of the sensed area 406 that do not include the overlapping region 410, as it is only these regions of the sensed area 406 that are not otherwise known or sensed by the agent 404. Map voxel updates corresponding to map areas behind the agent 402 are also not included in such transmitted messages.

Cooperative Contextual MAP (CCM) SoC

As noted above, the cooperative contextual map (CCM) aspects as described herein may be formed as part of a system on a chip (SoC). This SoC may include one or more portions of the system 100 as shown and discussed herein with reference to FIG. 1, such as the CMS 106, for example. As another example, the SoC further described below may form the entirety of the system 100 that is implemented by an autonomous agent to provide dynamic map voxel updates and message transmission regarding map voxel updates as discussed herein.

Figure 5A:
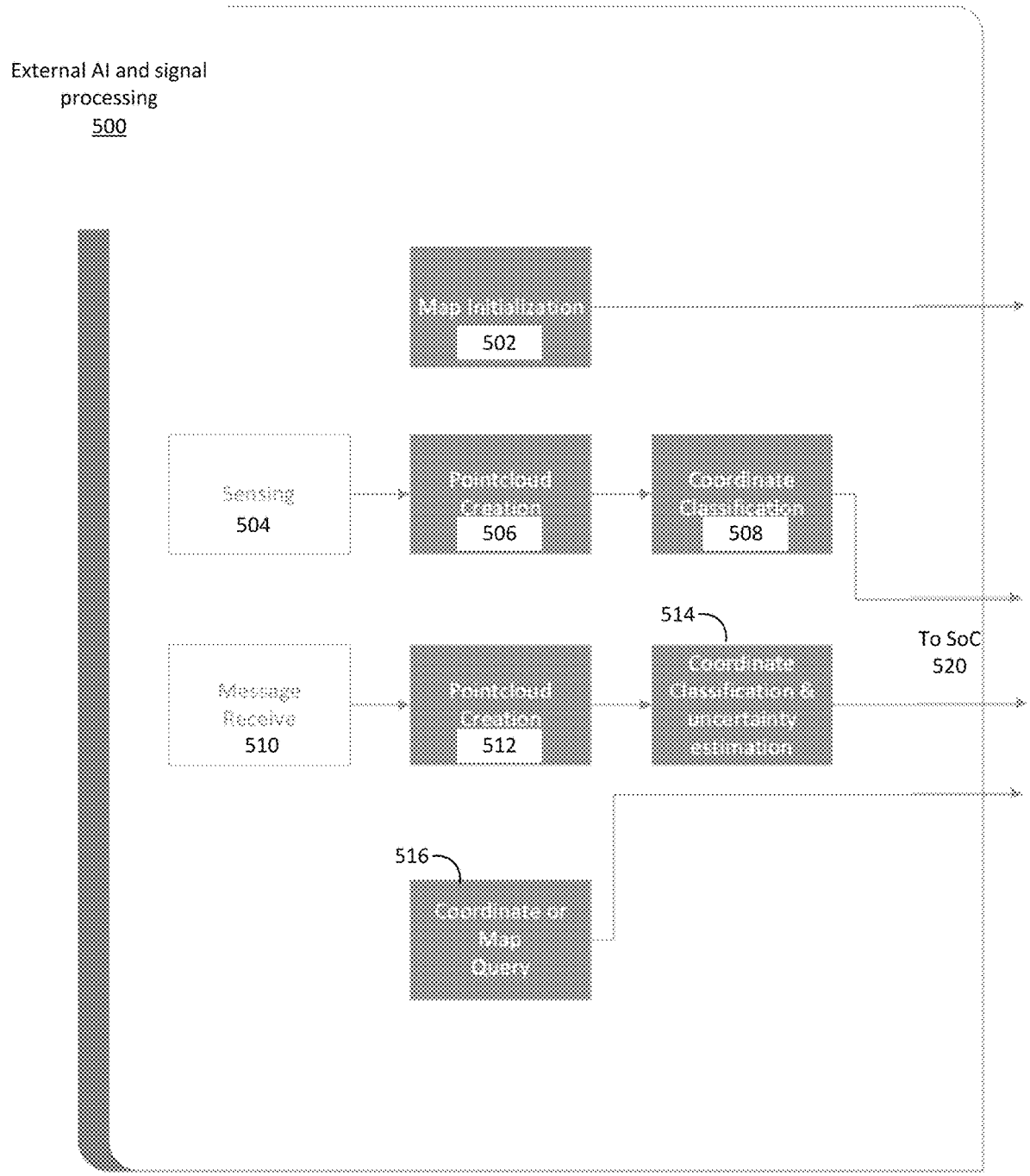
FIGS. 5A-5B illustrate block diagrams associated with various portions of a system on a chip (SoC) architecture used for a cooperative contextual map (CCM), in accordance with an aspect of the disclosure.
Figure 5B:
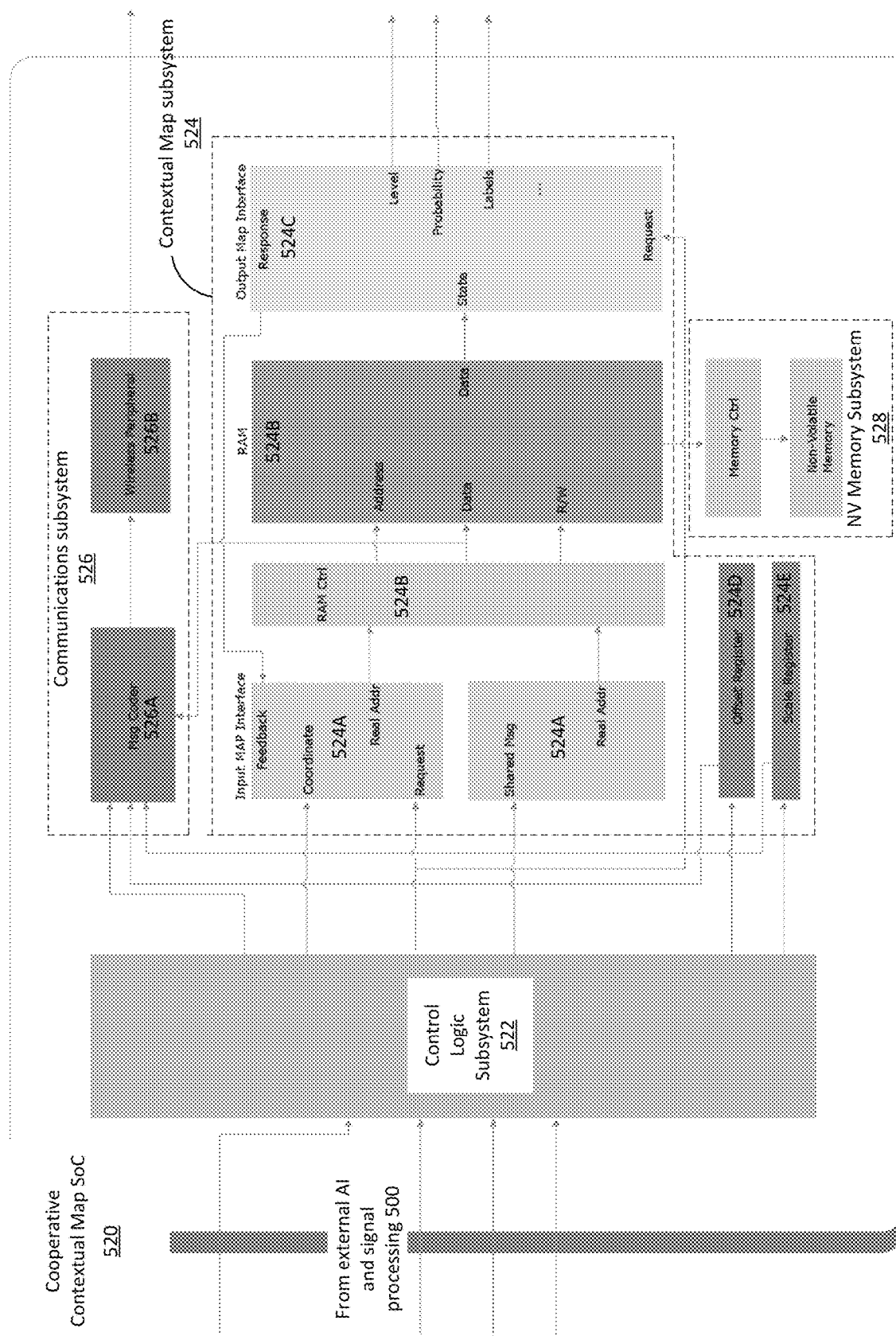

To do so, the SoC 520 as shown in FIG. 5B takes advantage of a Contextual Map Memory to manage cooperative map updates. For instance, FIG. 5B shows an example of an overall general SoC architecture 520 that includes various portions, in accordance with aspects of the present disclosure. The additional FIGS. 5C-5G are further directed to specific portions of the general SoC architecture 520 and are presented for clarity with an accompanying explanation of each portion's respective function as part of the overall SoC architecture 520.

As shown, FIG. 5A is directed to the various external AI and signal processing components of the system 100 as shown in FIG. 1, which may work in conjunction with the various components of the SoC architecture 520 as shown in FIG. 5B. The AI and signal processing components 500 may be considered external with respect to the SoC architecture 520 as shown in FIG. 5B and may communicate with the various components of the SoC 520 using any suitable interfaces and/or communication protocols. Moreover, although referred to as "external components," the external AI and signal processing components 500 may be internal to (e.g., integrated or otherwise implemented as a part of) an agent as discussed herein or, alternatively, be positioned external to the agent and the SoC architecture 520.

As shown in FIG. 5A, the external AI and signal processing components 500 may function to provide data to the SoC architecture 520 to facilitate online map updating and the generation and transmission of messages to other agents, as discussed herein. To do so, the external AI and signal processing components 500 may include any suitable combination of hardware and/or software to provide data to the control logic of the SoC architecture 520 as shown in FIG. 5B, which may be represented as the various blocks, modules, or engines as shown in FIG. 5A. For instance, the map initialization engine 502 loads the baseline map data to the SoC, whereas the coordinate or map query engine 516 sends query location data to the SoC 520 to facilitate the retrieval of map content at a particular queried location p, as discussed above.

Moreover, the sensing block 504 and the message receive block 510 may represent the various sensors and/or interfaces as discussed above with reference to the external monitoring system 102. Thus, the pointcloud creation engine 506 may map points in the point cloud list with respect to a baseline static map as noted above with respect to the static map 108 and FIG. 3, and the coordinate classification engine may further classify the coordinates based upon the sensor data as discussed above with reference to the object classifier module 112 of FIG. 1. The pointcloud creation engine 512 and the coordinate classification and uncertainty estimation engine 514 may likewise map points in the point cloud list with respect to a baseline static map as noted above and classify the coordinates. However, the pointcloud creation engine 512 and the coordinate classification and uncertainty estimation engine 514 may do so based upon the data derived from received messages, with the uncertainty estimation being performed based upon the priority and/or reliability of each received message as noted above.

In various aspects, the external AI and signal processing components 500 may implement algorithms such as, for example, map initialization, AI classification of Road Users, or contextual information queries for post-processing to take advantage of the SoC implementation. In any event, the SoC 520 may receive this data to perform the functions as discussed herein with respect to performing cooperative contextual mapping among agents in a particular environment, as discussed herein. To do so, the SoC 520 as shown in FIG. 5B may be generally divided into four subsystems. These include a control logic subsystem 522, a hardware (HW) contextual map subsystem 524, a communications subsystem 526, and a non-volatile (NV) memory subsystem 528. These four subsystems may also be identified with one or more portions of the system 100 as shown and discussed herein with reference to FIG. 1, such as the CMS 106, for example.

In an aspect, the control logic subsystem 522 is configured to decode, i.e. to determine, a particular type of action for the contextual map subsystem 524 to execute depending on the information provided via external classification context identified locally by an agent or identified within received messages. For example, the control logic subsystem 522 may compare detected objects with a reference contextual map and classify coordinates to facilitate the cooperative mapping of newly detected information by one or more agents in an operating environment. The control logic subsystem 522 may additionally be configured to enable or disable the saving of information into the RAM memory utilized by the HW contextual map subsystem 524. Thus, aspects include the control logic subsystem 522 controlling which relevant information is saved into the contextual map. For example, if no additional objects are detected over some time period, then the control logic subsystem 522 may communicate with the HW contextual map subsystem 524 to cause the HW contextual map subsystem 524 to save only static objects as part of the contextual map.

In other words, aspects include the control logic subsystem 522 receiving the generated initial point cloud list that is mapped based upon sensor data provided by the first agent (e.g., from the external AI and signal processing components 500), which is associated with an online map that may be shared among other agents operating within the same environment. The control logic subsystem 522 may additionally receive, via the external AI and signal processing components 500, one or more messages transmitted by other agents operating in the same environment as the agent associated with the SoC 520 (e.g., an "ego" agent).

As shown in FIG. 5, the HW contextual map subsystem 524 includes three different modules, which may be considered a part of the SoC 520 and thus include any suitable hardware and/or software components to facilitate the respective functions as discussed herein. For instance, the HW contextual map subsystem 524 as shown in FIG. 5 includes an input map interface module 524A, a memory module 524B, and a query module 524C. In an aspect, the contextual map subsystem may be configured to process the messages transmitted by the other agents in the same environment and then to identify voxel changes within the generated initial point cloud list identified by these other agents via the sent messages. Using the information in the sent messages, the HW contextual map subsystem 524 may then update the points in the initial point cloud list in accordance with the identified voxel changes as indicated in the messages transmitted by the other agents to generate an updated online map.

Again, the voxel changes included in the messaged transmitted by the other agents in the operating environment may be identified using the OOI that is included as part of the messages transmitted by other agent's within the operating environment and received by the ego agent, which indicate the absence or the presence of an obstacle of a certain type associated with the identified voxel changes. And, as discussed above, these identified voxel changes may include an object class (e.g., type) and one or more attributes of objects contained within each of the one or more voxels within the online map, as shown and discussed herein with reference to FIG. 5D, for instance. Thus, the identified voxel changes may be identified by another agent and/or include voxel changes that are otherwise unable to be identified via sensors of the ego agent (e.g., due to an obstruction in the ego agent's field of view).

To do so, in an aspect, the input map interface module 524A is configured to generate a hash value depending on the context that points to a specific memory address. Thus, the input map interface 524A functions to translate map coordinates, requests, and received shared messages provided by the control logic subsystem 522 to a generated hash value corresponding to an appropriate address via one or more of the "real addr" lines as shown. Moreover, aspects include the input map interface module 524A sensing new data provided by the control logic subsystem by using a coordinate in space and transforming the coordinate through a hash function into a memory address. The described hash function has the property of generating contiguous memory addresses for the different levels of a voxel. For example, at maximum discretization of the Octree voxel representation, all contiguous space voxels will be located in contiguous memory addresses. In this manner, efficient contextual search can be executed.

With continued reference to the input map interface module 524A and the operation with respect to received shared messages, aspects include the input map interface module 524A implementing cooperative mapping by providing the capability of transforming a neighbor map into a local map system. For example, in autonomous vehicles use cases, a global coordinate system exists. However, due to memory constraints, each vehicle may represent different sections of a "global map" and in different scales. Aspects include the input map interface module 524A processing this offset and scale of a map that is included as part of the messages transmitted from other agents.

To do so, aspects include the input map interface module 524A generating a key (i.e., a memory address offset) from an input coordinate. The generated key may then be applied to the input coordinate to transform the input coordinate to the current offset and scale of the local agent's map. As an example, this key may be generated via the following function, which is depicted below as Equation 4:

Key:Coordinate→Memory Address Offset

Key(Coordinate)hash function  Eqn. 4

Using this information (Key, Offset, Scale) from a neighbor agent, aspects include the input map interface module 524A defining a transformation function using a received share message to output a real address such that the Key is transformed to the self-map information as expressed below in Equation 5 as follows:

Function $T(Key_{neighbor}, Offset_{neighbor}, Scale_{neighbor}, Offset, Scale) = Key_{new}$  Eqn. 5

Figure 6:
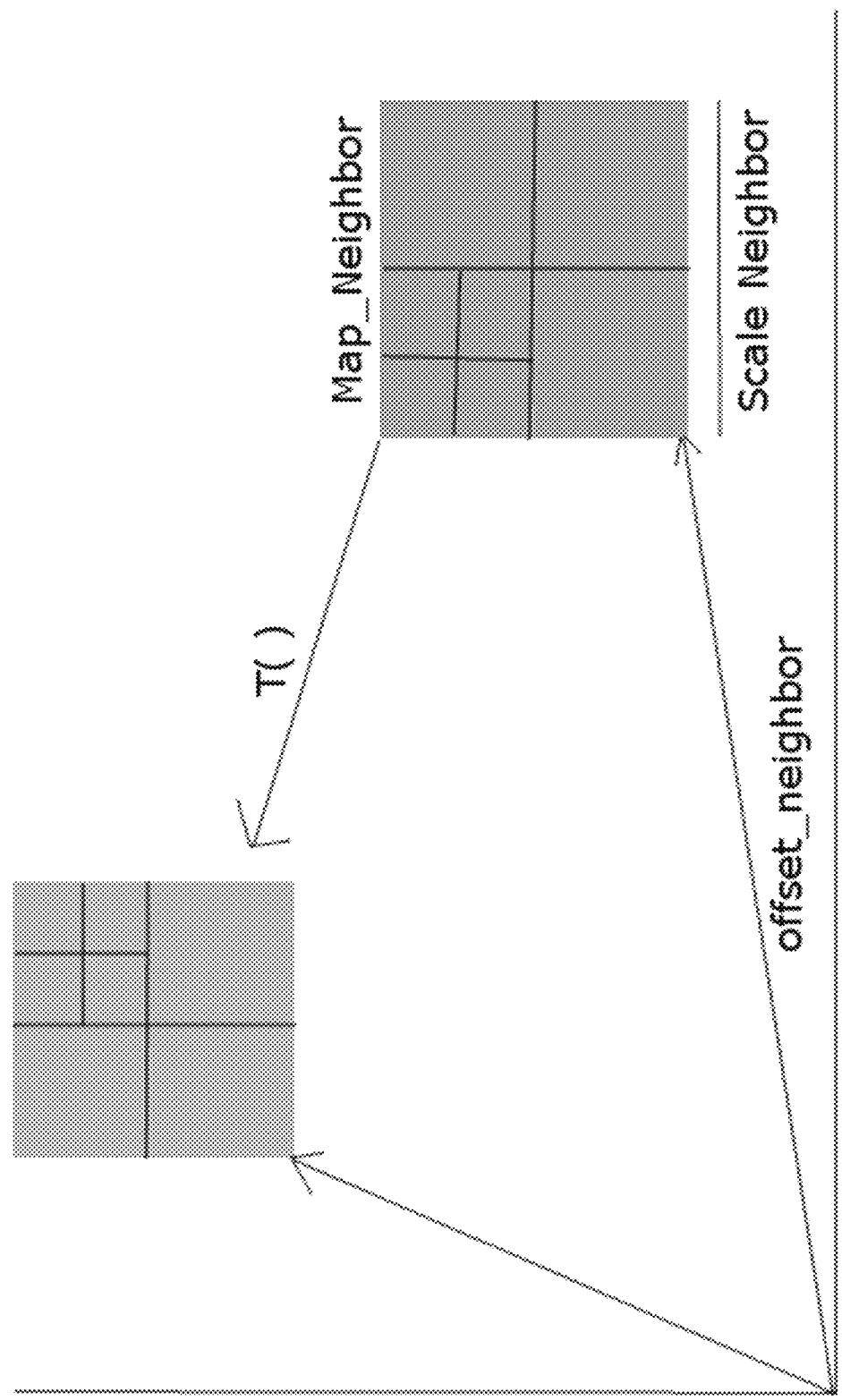
FIG. 6 illustrates a block diagram of a transform function, in accordance with an aspect of the disclosure.

The use of this transformation function to translate the coordinates of a neighboring agent to the local agent's map is illustrated in FIG. 6.

Moreover, before updating the map saved in memory, aspects include updating the uncertainty of shared messages using the data presented in the message such as id, the distance between agents, classification, time, received occupancy probability, etc. A function defining the use of these parameters from a received message for this purpose is represented below in Equation 6 as follows:

$f(id, distance, classification, time, Probability_{old}) = Probability_{new}$  Eqn. 6

Thus, aspects include the contextual map subsystem 524 further implementing an offset register 524D and scale register 524E as shown in FIG. 5B. In an aspect, the offset register 524D and scale register 524E may facilitate locally saving the values of the current offset and scale for a particular agent on the SoC 520.

The SoC 520 may optionally include the communications subsystem 526. In aspects in which the communications subsystem 526 is enabled by the control logic subsystem 522, the communications subsystem 526 functions to save information regarding a voxel of a current query into a buffer queue via a message coder 526A. This information may be further compressed and then transmitted to other agents through an external communication device to facilitate cooperative mapping among several agents operating in a particular environment. For example, as shown in FIG. 5B, aspect include the use of an additional wireless communication peripheral 526B, which may accelerate some communication protocols.

In various aspects, different strategies may be implemented to create a message to share with other agents. These strategies may be implemented via the control logic subsystem 522 and the messages transmitted via the communications subsystem 526. For example, if sensed object(s)/voxel(s) are to be shared, then the message coder module 526A may use the key output by the contextual map subsystem 524 by applying the offset and scale generated by (or stored in) the offset register 524D and scale register 524E. This information may be used in conjunction with the information regarding the given voxel (id, classification, offset, scale, probability, etc.), which is added to a Send Queue. Again, the packages to be sent may also be compressed before sending.

In an aspect, the memory module 524B is configured to save the contextual data sent via the control logic subsystem 522 (e.g. map coordinates, requests, and/or received message data) to the generated address via the RAM control module 524B. Further in accordance with the present aspects, the output map interface 524C is configured to calculate specific queries on data that is saved in the RAM memory to output relevant queries information such as a voxel level, probability, label, etc., as shown in FIG. 5.

Finally, aspects include the NV memory subsystem 528 being configured as any suitable type of non-volatile memory and configured to save the contextual map memory stored in the RAM 524B and update this contextual map memory as necessary.

EXAMPLES

The following examples pertain to further aspects.

Example 1 is a system on a chip (SoC), comprising: a control logic subsystem associated with a first agent, the control logic subsystem configured to receive (i) a generated initial point cloud list associated with an online map that is shared with a second agent operating within the same environment as the first agent, the points in the initial point cloud list being mapped based upon sensor data provided by the first agent, and (ii) one or more messages transmitted by the second agent; and a contextual map subsystem associated with the first agent, the contextual map subsystem being configured to (i) process the one or more messages transmitted by the second agent to identify voxel changes within the generated initial point cloud list identified by the second agent, and (ii) update the points in the initial point cloud list in accordance with the identified voxel changes as indicated in the one or more messages to generate an updated online map.

In Example 2, the subject matter of Example 1, wherein the identified voxel changes include an object class and at least one attribute of objects contained within each of the identified voxels of the online map.

In Example 3, the subject matter of any combination of Examples 1-2, wherein the identified voxel changes include one or more objects contained within one or more voxels of the online map that are identified by the second agent and unable to be identified via sensors of the first agent.

In Example 4, the subject matter of any combination of Examples 1-3, wherein the one or more messages transmitted by the second agent contain an object of interest (OOI) that indicates the absence or the presence of an obstacle of a certain type associated with the identified voxel changes.

In Example 5, the subject matter of any combination of Examples 1-4, wherein the contextual map subsystem is further configured to select a parent voxel from the initial point cloud list associated with the online map, and to generate an update message for transmission to the second agent by adding obstacles associated with the parent voxel and children of the parent voxel to a voxel list.

In Example 6, the subject matter of any combination of Examples 1-5, wherein the voxel list identifies changes to voxels included in the points in the initial point cloud list associated with the online map that are detected by sensors of the first agent.

In Example 7, the subject matter of any combination of Examples 1-6, further comprising: a communications subsystem configured to transmit the update message including the obstacles associated with the parent voxel and children of the parent voxel in the voxel list, and wherein the update message enables the second agent, upon receiving the update message, to update the points in the initial point cloud list in accordance with the identified changes to the voxels in the voxel list to generate a further updated online map.

In Example 8, the subject matter of any combination of Examples 1-7, wherein the first agent is an autonomous vehicle.

Example 9 is a non-transitory computer-readable media associated with a first agent having instructions stored thereon that, when executed by one or more processors, cause the first agent to: map points in an initial point cloud list associated with an online map that is shared with a second agent operating within the same environment as the first agent, the points in the initial point cloud list being mapped based upon sensor data provided by the first agent; receive one or more messages from the second agent identifying voxel changes included in the online map that was mapped by the first agent; and update the points in the initial point cloud list in accordance with the identified voxel changes as indicated in the one or more messages to generate an updated online map.

In Example 10, the subject matter of Example 9, wherein the computer-readable media further includes instructions that, when executed by one or more processors, cause the first agent to: add each of the one or more received messages to a message list; and update the points in the initial point cloud list in accordance with the identified voxel changes as indicated in each of the one or more messages only when the message list is empty, and otherwise repeatedly mapping obstacles identified in each of the one or more messages contained in the message list.

In Example 11, the subject matter of any combination of Examples 9-10, wherein the identified voxel changes include an object class and at least one attribute of objects contained within each of the identified voxels of the online map, and wherein the one or more messages received from the second agent contain an object of interest (OOI) that indicates the absence or the presence of an obstacle of a certain type associated with the identified voxel changes.

In Example 12, the subject matter of any combination of Examples 9-11, wherein the computer-readable media further includes instructions that, when executed by one or more processors, cause the first agent to: initiate the generation of an update message by selecting a parent voxel from the initial point cloud list associated with the online map; and generate the update message for transmission to the second agent by adding obstacles associated with the parent voxel and children of the parent voxel to a voxel list, wherein the voxel list identifies changes to voxels included in the points in the initial point cloud list associated with the online map that are detected by sensors of the first agent.

In Example 13, the subject matter of any combination of Examples 9-12, wherein the computer-readable media further includes instructions that, when executed by one or more processors, cause the first agent to: transmit the update message including the obstacles associated with the parent voxel and children of the parent voxel in the voxel list, wherein the update message enables the second agent, upon receiving the transmitted update message, to update the points in the initial point cloud list in accordance with the identified changes to the voxels in the voxel list to generate a further updated online map.

In Example 14, the subject matter of any combination of Examples 9-13, wherein the computer-readable media further includes instructions that, when executed by one or more processors, cause the first agent to initiate the generation of the update message concurrently with receiving the one or more messages from the second agent.

Example 15 is a non-transitory computer-readable media associated with a first agent having instructions stored thereon that, when executed by one or more processors, cause the first agent to: select a parent voxel from an initial point cloud list associated with an online map that is shared with a second agent operating within the same environment as the first agent, the points in the initial point cloud list being mapped based upon sensor data provided by the first agent; generate a message for transmission by adding, by the first agent, obstacles associated with the parent voxel and children of the parent voxel to a voxel list that identifies changes to voxels in the online map; and transmit the message including the obstacles associated with the parent voxel and children of the parent voxel in the voxel list, wherein the message enables the second agent, upon receiving the message, to update the points in the initial point cloud list in accordance with the identified changes to the voxels in the voxel list to generate an updated online map.

In Example 16, the subject matter of Example 15, wherein the computer-readable media further includes instructions that, when executed by one or more processors, cause the first agent to transmit the message only when the voxel list is empty as a result of no additional changes being identified to the voxels included in the points in the initial point cloud list, and otherwise to repeatedly add the obstacles associated with the parent voxel and children of the parent voxel to the voxel list.

In Example 17, the subject matter of any combination of Examples 15-16, wherein the computer-readable media further includes instructions that, when executed by one or more processors, cause the first agent to receive one or more messages from the second agent identifying voxel changes included in the online map that was mapped by the first agent, and to update the points in the initial point cloud list in accordance with the identified voxel changes as indicated in the one or more messages to generate an updated online map.

In Example 18, the subject matter of any combination of Examples 15-17, wherein the computer-readable media further includes instructions that, when executed by one or more processors, cause the first agent to add each of the one or more received messages from the second agent to a message list, to update the points in the initial point cloud list in accordance with the identified voxel changes as indicated in each of the one or more messages only when the message list is empty, and to otherwise repeatedly map obstacles identified in each of the one or more messages contained in the message list.

In Example 19, the subject matter of any combination of Examples 15-18, wherein the computer-readable media further includes instructions that, when executed by one or more processors, cause the first agent to generate the message concurrently with receiving the one or more messages from the second agent.

In Example 20, the subject matter of any combination of Examples 15-19, wherein the identified voxel changes include an object class and at least one attribute of objects contained within each of the identified voxels of the online map, and wherein the message transmitted to the second agent contains an object of interest (OOI) that indicates the absence or the presence of an obstacle of a certain type associated with the identified voxel changes.

Example 21 is a system on a chip (SoC), comprising: a control logic subsystem means associated with a first agent, the control logic subsystem means receiving (i) a generated initial point cloud list associated with an online map that is shared with a second agent operating within the same environment as the first agent, the points in the initial point cloud list being mapped based upon sensor data provided by the first agent, and (ii) one or more messages transmitted by the second agent; and a contextual map subsystem means associated with the first agent, the contextual map subsystem means (i) processing the one or more messages transmitted by the second agent to identify voxel changes within the generated initial point cloud list identified by the second agent, and (ii) updating the points in the initial point cloud list in accordance with the identified voxel changes as indicated in the one or more messages to generate an updated online map.

In Example 22, the subject matter of Example 21, wherein the identified voxel changes include an object class and at least one attribute of objects contained within each of the identified voxels of the online map.

In Example 23, the subject matter of any combination of Examples 21-22, wherein the identified voxel changes include one or more objects contained within one or more voxels of the online map that are identified by the second agent and unable to be identified via sensors of the first agent.

In Example 24, the subject matter of any combination of Examples 21-23, wherein the one or more messages transmitted by the second agent contain an object of interest (OOI) that indicates the absence or the presence of an obstacle of a certain type associated with the identified voxel changes.

In Example 25, the subject matter of any combination of Examples 21-24, wherein the contextual map subsystem means selects a parent voxel from the initial point cloud list associated with the online map, and generates an update message for transmission to the second agent by adding obstacles associated with the parent voxel and children of the parent voxel to a voxel list.

In Example 26, the subject matter of any combination of Examples 21-25, wherein the voxel list identifies changes to voxels included in the points in the initial point cloud list associated with the online map that are detected by sensors of the first agent.

In Example 27, the subject matter of any combination of Examples 21-26, further comprising: a communications subsystem means for transmitting the update message including the obstacles associated with the parent voxel and children of the parent voxel in the voxel list, and wherein the update message enables the second agent, upon receiving the update message, to update the points in the initial point cloud list in accordance with the identified changes to the voxels in the voxel list to generate a further updated online map.

In Example 28, the subject matter of any combination of Examples 21-27, wherein the first agent is an autonomous vehicle.

Example 29 is a non-transitory computer-readable media means for causing a first agent to: map points in an initial point cloud list associated with an online map that is shared with a second agent operating within the same environment as the first agent, the points in the initial point cloud list being mapped based upon sensor data provided by the first agent; receive one or more messages from the second agent identifying voxel changes included in the online map that was mapped by the first agent; and update the points in the initial point cloud list in accordance with the identified voxel changes as indicated in the one or more messages to generate an updated online map.

In Example 30, the subject matter of Example 29, wherein the computer-readable media means further causes the first agent to: add each of the one or more received messages to a message list; and update the points in the initial point cloud list in accordance with the identified voxel changes as indicated in each of the one or more messages only when the message list is empty, and otherwise repeatedly mapping obstacles identified in each of the one or more messages contained in the message list.

In Example 31, the subject matter of any combination of Examples 29-30, wherein the identified voxel changes include an object class and at least one attribute of objects contained within each of the identified voxels of the online map, and wherein the one or more messages received from the second agent contain an object of interest (OOI) that indicates the absence or the presence of an obstacle of a certain type associated with the identified voxel changes.

In Example 32, the subject matter of any combination of Examples 29-31, wherein the computer-readable media means further causes the first agent to: initiate the generation of an update message by selecting a parent voxel from the initial point cloud list associated with the online map; and generate the update message for transmission to the second agent by adding obstacles associated with the parent voxel and children of the parent voxel to a voxel list, wherein the voxel list identifies changes to voxels included in the points in the initial point cloud list associated with the online map that are detected by sensors of the first agent.

In Example 33, the subject matter of any combination of Examples 29-32, wherein the computer-readable media means further causes the first agent to: transmit the update message including the obstacles associated with the parent voxel and children of the parent voxel in the voxel list, wherein the update message enables the second agent, upon receiving the transmitted update message, to update the points in the initial point cloud list in accordance with the identified changes to the voxels in the voxel list to generate a further updated online map.

In Example 34, the subject matter of any combination of Examples 29-33, wherein the computer-readable media means further causes the first agent to initiate the generation of the update message concurrently with receiving the one or more messages from the second agent.

Example 35 is a non-transitory computer-readable media means for causing a first agent to: select a parent voxel from an initial point cloud list associated with an online map that is shared with a second agent operating within the same environment as the first agent, the points in the initial point cloud list being mapped based upon sensor data provided by the first agent; generate a message for transmission by adding, by the first agent, obstacles associated with the parent voxel and children of the parent voxel to a voxel list that identifies changes to voxels in the online map; and transmit the message including the obstacles associated with the parent voxel and children of the parent voxel in the voxel list, wherein the message enables the second agent, upon receiving the message, to update the points in the initial point cloud list in accordance with the identified changes to the voxels in the voxel list to generate an updated online map.

In Example 36, the subject matter of Example 35, wherein the computer-readable media means further causes the first agent to transmit the message only when the voxel list is empty as a result of no additional changes being identified to the voxels included in the points in the initial point cloud list, and otherwise to repeatedly add the obstacles associated with the parent voxel and children of the parent voxel to the voxel list.

In Example 37, the subject matter of any combination of Examples 35-36, wherein the computer-readable media means further causes the first agent to receive one or more messages from the second agent identifying voxel changes included in the online map that was mapped by the first agent, and to update the points in the initial point cloud list in accordance with the identified voxel changes as indicated in the one or more messages to generate an updated online map.

In Example 38, the subject matter of any combination of Examples 35-37, wherein the computer-readable media means further causes the first agent to add each of the one or more received messages from the second agent to a message list, to update the points in the initial point cloud list in accordance with the identified voxel changes as indicated in each of the one or more messages only when the message list is empty, and to otherwise repeatedly map obstacles identified in each of the one or more messages contained in the message list.

In Example 39, the subject matter of any combination of Examples 35-38, wherein the computer-readable media means further causes the first agent to generate the message concurrently with receiving the one or more messages from the second agent.

In Example 40, the subject matter of any combination of Examples 35-39, wherein the identified voxel changes include an object class and at least one attribute of objects contained within each of the identified voxels of the online map, and wherein the message transmitted to the second agent contains an object of interest (OOI) that indicates the absence or the presence of an obstacle of a certain type associated with the identified voxel changes.

An apparatus as shown and described.

A method as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processing circuitry" or "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM).

The memory can be non-removable, removable, or a combination of both.

What is claimed is:

1. A system on a chip (SoC), comprising:
  a control logic subsystem associated with a first agent, the control logic subsystem configured to receive (i) a generated initial point cloud list associated with an online map that is shared with a second agent operating within the same environment as the first agent, the points in the initial point cloud list being mapped based upon sensor data provided by the first agent, and (ii) one or more messages transmitted by the second agent; and
  a contextual map subsystem associated with the first agent, the contextual map subsystem being configured to (i) process the one or more messages transmitted by the second agent to identify voxel changes within the generated initial point cloud list identified by the second agent, (ii) update the points in the initial point cloud list in accordance with the identified voxel changes as indicated in the one or more messages to generate an updated online map, and (iii) select a parent voxel from the initial point cloud list associated with the online map and generate an update message for transmission to the second agent by adding obstacles associated with the parent voxel and children of the parent voxel to a voxel list.

2. The SoC of claim 1, wherein the identified voxel changes include an object class and at least one attribute of objects contained within each of the identified voxels of the online map.

3. The SoC of claim 1, wherein the identified voxel changes include one or more objects contained within one or more voxels of the online map that are identified by the second agent and unable to be identified via sensors of the first agent.

4. The SoC of claim 1, wherein the one or more messages transmitted by the second agent contain an object of interest (OOI) that indicates the absence or the presence of an obstacle of a certain type associated with the identified voxel changes.

5. The SoC of claim 1, wherein the voxel list identifies changes to voxels included in the points in the initial point cloud list associated with the online map that are detected by sensors of the first agent.

6. The SoC of claim 1, further comprising:
a communications subsystem configured to transmit the update message including the obstacles associated with the parent voxel and children of the parent voxel in the voxel list, and
wherein the update message enables the second agent, upon receiving the update message, to update the points in the initial point cloud list in accordance with the identified changes to the voxels in the voxel list to generate a further updated online map.

7. The SoC of claim 1, wherein the first agent is an autonomous vehicle.

8. A non-transitory computer-readable media associated with a first agent having instructions stored thereon that, when executed by one or more processors, cause the first agent to:
map points in an initial point cloud list associated with an online map that is shared with a second agent operating within the same environment as the first agent, the points in the initial point cloud list being mapped based upon sensor data provided by the first agent;
receive one or more messages from the second agent identifying voxel changes included in the online map that was mapped by the first agent;
update the points in the initial point cloud list in accordance with the identified voxel changes as indicated in the one or more messages to generate an updated online map;
initiate the generation of an update message by selecting a parent voxel from the initial point cloud list associated with the online map; and
generate the update message for transmission to the second agent by adding obstacles associated with the parent voxel and children of the parent voxel to a voxel list.

9. The non-transitory computer-readable media of claim 8, wherein the computer-readable media further includes instructions that, when executed by one or more processors, cause the first agent to:
add each of the one or more received messages to a message list; and
update the points in the initial point cloud list in accordance with the identified voxel changes as indicated in each of the one or more messages only when the message list is empty, and otherwise repeatedly mapping obstacles identified in each of the one or more messages contained in the message list.

10. The non-transitory computer-readable media of claim 8, wherein the identified voxel changes include an object class and at least one attribute of objects contained within each of the identified voxels of the online map, and
wherein the one or more messages received from the second agent contain an object of interest (OOI) that indicates the absence or the presence of an obstacle of a certain type associated with the identified voxel changes.

11. The non-transitory computer-readable media of claim 8,
wherein the voxel list identifies changes to voxels included in the points in the initial point cloud list associated with the online map that are detected by sensors of the first agent.

12. The non-transitory computer-readable media of claim 8, wherein the computer-readable media further includes instructions that, when executed by one or more processors, cause the first agent to:
transmit the update message including the obstacles associated with the parent voxel and children of the parent voxel in the voxel list,
wherein the update message enables the second agent, upon receiving the transmitted update message, to update the points in the initial point cloud list in accordance with the identified changes to the voxels in the voxel list to generate a further updated online map.

13. The non-transitory computer-readable media of claim 8, wherein the computer-readable media further includes instructions that, when executed by one or more processors, cause the first agent to initiate the generation of the update message concurrently with receiving the one or more messages from the second agent.

14. A non-transitory computer-readable media associated with a first agent having instructions stored thereon that, when executed by one or more processors, cause the first agent to:
select a parent voxel from an initial point cloud list associated with an online map that is shared with a second agent operating within the same environment as the first agent, the points in the initial point cloud list being mapped based upon sensor data provided by the first agent;
generate a message for transmission by adding, by the first agent, obstacles associated with the parent voxel and children of the parent voxel to a voxel list that identifies changes to voxels in the online map; and
transmit the message including the obstacles associated with the parent voxel and children of the parent voxel in the voxel list,
wherein the message enables the second agent, upon receiving the message, to update the points in the initial point cloud list in accordance with the identified changes to the voxels in the voxel list to generate an updated online map.

15. The non-transitory computer-readable media of claim 14, wherein the computer-readable media further includes instructions that, when executed by one or more processors, cause the first agent to transmit the message only when the voxel list is empty as a result of no additional changes being identified to the voxels included in the points in the initial point cloud list, and otherwise to repeatedly add the obstacles associated with the parent voxel and children of the parent voxel to the voxel list.

16. The non-transitory computer-readable media of claim 14, wherein the computer-readable media further includes instructions that, when executed by one or more processors, cause the first agent to receive one or more messages from the second agent identifying voxel changes included in the online map that was mapped by the first agent, and to update the points in the initial point cloud list in accordance with the identified voxel changes as indicated in the one or more messages to generate an updated online map.

17. The non-transitory computer-readable media of claim 16, wherein the computer-readable media further includes instructions that, when executed by one or more processors, cause the first agent to add each of the one or more received messages from the second agent to a message list, to update the points in the initial point cloud list in accordance with the identified voxel changes as indicated in each of the one or more messages only when the message list is empty, and to otherwise repeatedly map obstacles identified in each of the one or more messages contained in the message list.

18. The non-transitory computer-readable media of claim 17, wherein the computer-readable media further includes instructions that, when executed by one or more processors, cause the first agent to generate the message concurrently with receiving the one or more messages from the second agent.

19. The non-transitory computer-readable media of claim 14, wherein the identified voxel changes include an object class and at least one attribute of objects contained within each of the identified voxels of the online map, and
    wherein the message transmitted to the second agent contains an object of interest (OOI) that indicates the absence or the presence of an obstacle of a certain type associated with the identified voxel changes.

\* \* \* \* \*